United States Patent
Steiner et al.

(10) Patent No.: US 6,848,810 B2
(45) Date of Patent: Feb. 1, 2005

(54) EDGE LIGHT SOURCE FOR A FLAT PANEL DISPLAY OR LUMINAIRE

(75) Inventors: Ivan B. Steiner, Ridgewood, NJ (US); Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/421,600

(22) Filed: Apr. 23, 2003

(65) Prior Publication Data

US 2004/0004847 A1 Jan. 8, 2004

Related U.S. Application Data (60) Provisional application No. 60/375,973, filed on Apr. 24, 2002.

(51) Int. Cl.[7] .............................................. F21V 13/04
(52) U.S. Cl. ...................... 362/224; 362/223; 362/308; 362/327; 362/332; 362/335
(58) Field of Search ............................ 362/30, 31, 125, 362/126, 217, 222–224, 308, 326, 327, 332, 335, 561; 349/61–65

(56) References Cited

U.S. PATENT DOCUMENTS

| | | | | |
|---|---|---|---|---|
| 1,844,624 A | * | 2/1932 | Young et al. | 362/224 |
| 1,894,876 A | * | 1/1933 | Kuhn | 362/217 |
| 2,244,738 A | * | 6/1941 | Alm | 362/224 |
| 3,957,351 A | * | 5/1976 | Stockwell | 349/62 |
| 4,573,111 A | * | 2/1986 | Herst et al. | 362/223 |
| 5,825,440 A | * | 10/1998 | Kim | 349/61 |
| 5,902,034 A | * | 5/1999 | Santosuosso et al. | 362/224 |
| 6,238,054 B1 | * | 5/2001 | Doell | 362/31 |

FOREIGN PATENT DOCUMENTS

WO    WO 00 01986 A    1/2000

OTHER PUBLICATIONS

PCT/US 03/12893 International Search Report; Aug. 20, 2003.

* cited by examiner

*Primary Examiner*—Alan Cariaso
(74) *Attorney, Agent, or Firm*—Kurt Luther; James W. Falk

(57) ABSTRACT

A light source for a flat panel display or a luminare includes a tubular enclosure having a linear slit in which is positioned a lens structure which may be a cylindrical rod lens or a plurality of ball lenses. The lens, whether a rod or ball structure, has an opaque white reflective strip or coating facing inward of the tubular enclosure, thereby defining two narrow slit openings through which the light can be projected into the lens structure and into an associated waveguide.

16 Claims, 6 Drawing Sheets

FIG. 8
Ball Lens with one circular Slot

FIG. 7
Rod Lens with two linear Slots

EDGE LIGHT SOURCE FOR A FLAT PANEL DISPLAY OR LUMINAIRE

BACKGROUND OF THE INVENTION

1. Technical Field

This invention relates to lighting and more specifically to edge light backlights for flat panel displays or luminaires.

2. Background Art

Figure 1:
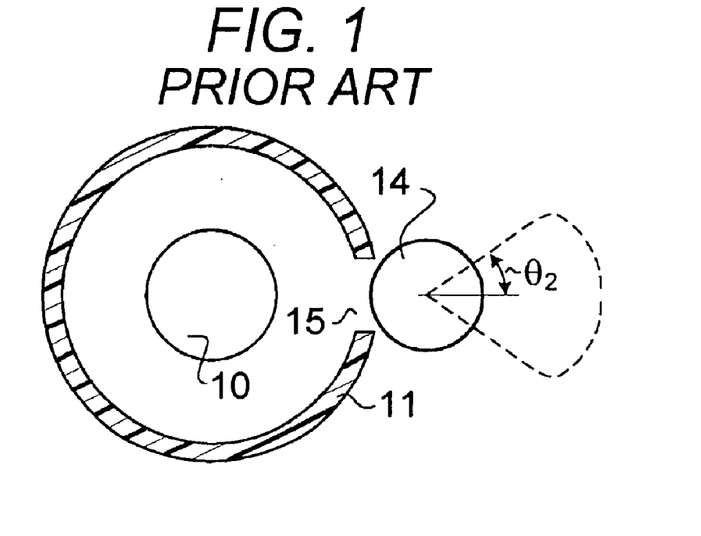
FIGS. 1 and 2 and depict the light source structure as shown in the Wilson patent.
Figure 2:
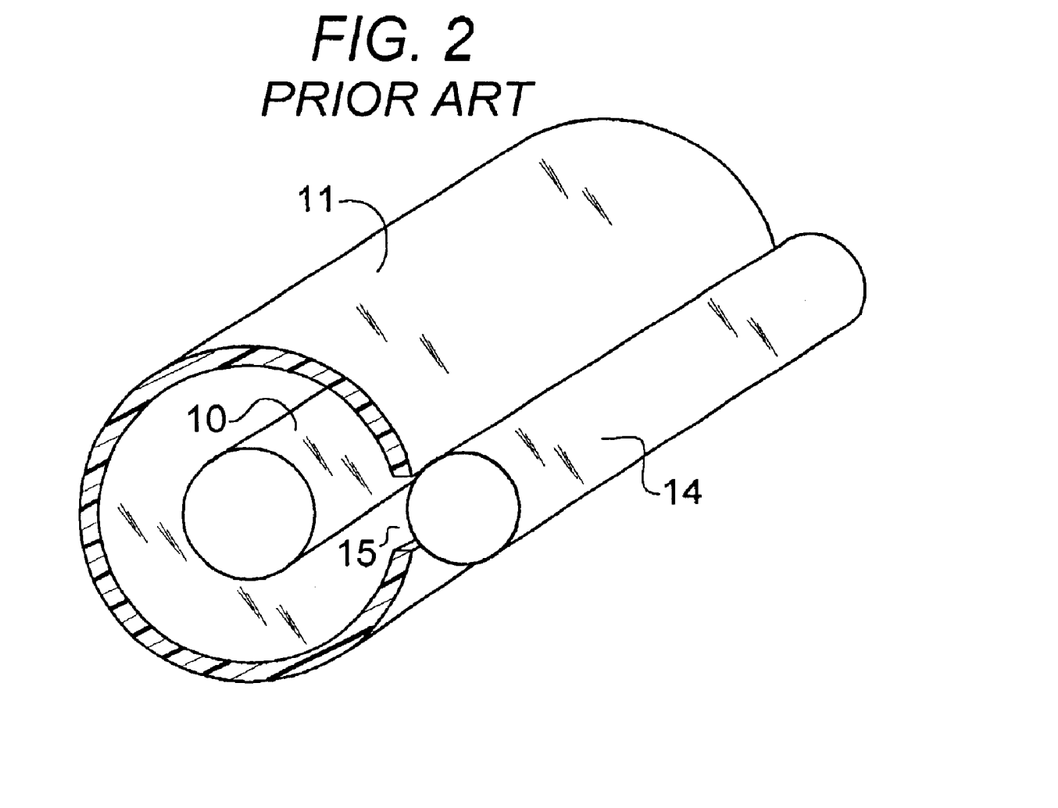

One structure for a backlight source is described in J. C. Wilson U.S. Pat. No. 6,299,328 B1, Oct. 9, 2001. As seen in FIGS. 1 and 2, which correspond to figures of the Wilson patent, a tubular light source 10, such as a fluorescent bulb, is positioned axially within a tubular reflective cavity 11 which has a linear slit opening 15 which allows light to pass from the light source 10 to a cylindrical rod lens 14 positioned in the opening. The cylindrical rod lens 14 may advantageously be positioned in an external waveguide that takes the light from the cylindrical rod lens to the equipment, such as a display, which is to be illuminated.

In the Wilson arrangement in order to achieve higher output irradiance and radiance for the linear illumination system, the linear slit opening 15 should have as large a width as possible, being constrained only to be less than the maximum inside width of the tubular cavity 11. The axes of the lamp 10, the tubular cavity 11, and the rod lens 14 are parallel. The cylindrical rod lens 14 projects the light into the associated waveguide in a single projection lobe having a wide angular range angular range of $\pm\theta_2$. More specifically, the cylindrical rod lens 14 receives light input through the linear slit opening 15 and projects this light towards a waveguide light input edge. The cylindrical form of the rod lens 14 collimates its light input from the tube enclosure only in the Y-Z plane. Accordingly the profile of light projected in the X-Z plane is uncollimated, which gives it a much wider angular distribution than the profile of the collimated component in the Y-Z plane. To minimize the angular span of the profile in the Y-Z plane for a given slit width, the tube enclosure's linear slit opening 15 should occupy the focal surface of the rod lens 14.

The light beams from this single lobe are reflected by the internal reflective surfaces of the waveguide. However, the efficiency of the light being transmitted through the waveguide is dependent on the number of reflections within the waveguide.

Accordingly, there is a need to increase the amount of luminous flux delivered to edge lit backlights and the luminous efficiency (lumens output per watt input) of the source system input to the backlight in the type of structure taught by the Wilson patent.

SUMMARY OF THE INVENTION

The present invention greatly increases the efficiency of the Wilson type of backlight source by structures that create two light lobes being projected through the tubular enclosure into the lens system, which in one embodiment is a rod lens as shown by Wilson and in another embodiment is a series of ball lenses. Specifically, in accordance with our invention, the linear opening in the tubular enclosure is split into two openings removed from each other. When the lens structure is a rod lens, a white stripe extends down the side of the rod lens blocking light from entering the rod lens over most of the area of the slit opening in the tubular enclosure. In the other embodiment of our invention wherein spherical ball lens are employed, the portion of the ball entering into the tubular enclosure in coated, as with a white coating, except for two circular clear holes in the coating. In each instance, the light from the tubular light source is split into two lobes which enter the lens structure at different angles and which greatly increase the number of reflections from the inner reflective surfaces of the associated waveguide, thereby attaining a considerably higher efficiency than the arrangement disclosed in the Wilson patent.

Our invention projects the same desirable angular projection ranges through a single lens element without the loss of projected light flux or light collimation as would be suffered by a double slit and double lens arrangement. Because our invention requires only one rod lens or a single array of ball lenses, the thickness of the waveguide backlight and the reflective mirror cavity need not be increased to accommodate two lens elements.

According to a first aspect, the present invention provides a backlight for a display, the backlight comprising:

a tubular enclosure having a linear slit opening;

a lamp device located within said tubular enclosure; and lens means for receiving light from said source through said linear slit opening and projecting said received light to a waveguide light input edge, said lens means being partially positioned in said linear slit opening to fill said linear slit opening and having an opaque light masking element located on said lens means positioned within said tubular enclosure so as to block light from said light source entering said lens means except at two discrete openings at opposite sides of said linear slit opening.

According to a second aspect, the present invention provides a light source for a display, the light source comprising:

a tubular enclosure having a reflective inner coating and a linear slit opening along the length of said enclosure;

an elongated light source positioned within said tubular enclosure and projecting light towards said linear slit opening; and means for blocking light from projecting through the central area of said linear slit opening so as to create two light lobes projected out of the tubular enclosure at different angles.

In accordance with the present invention the amount of luminous flux delivered to edge lit backlights is increased.

DETAILED DESCRIPTION OF THE INVENTION

Mode(s) for Carrying Out the Invention

Figure 3:
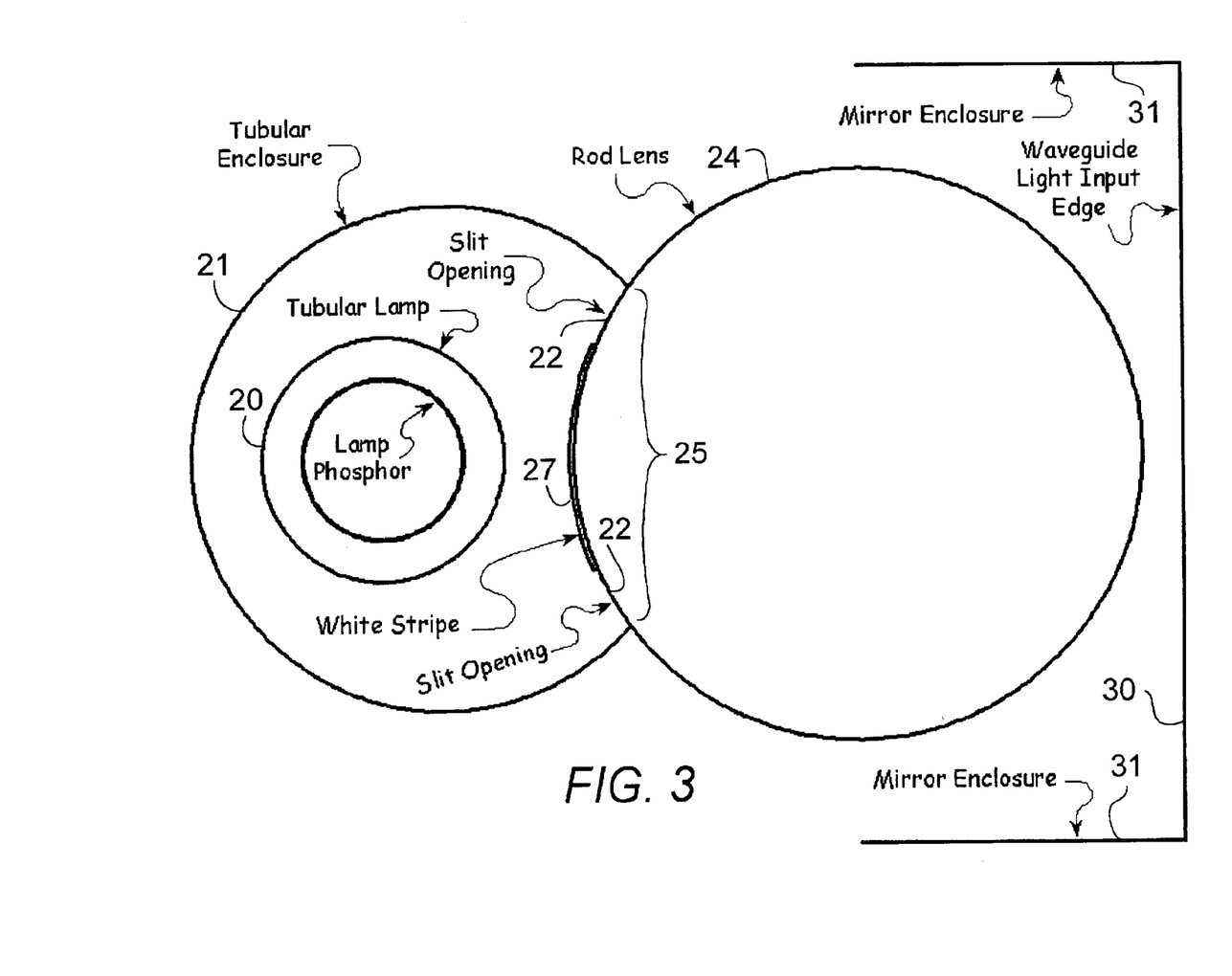
FIG. 3 depicts a first illustrative embodiment of our invention wherein the lens structure is an elongated rod lens.
Figure 4:
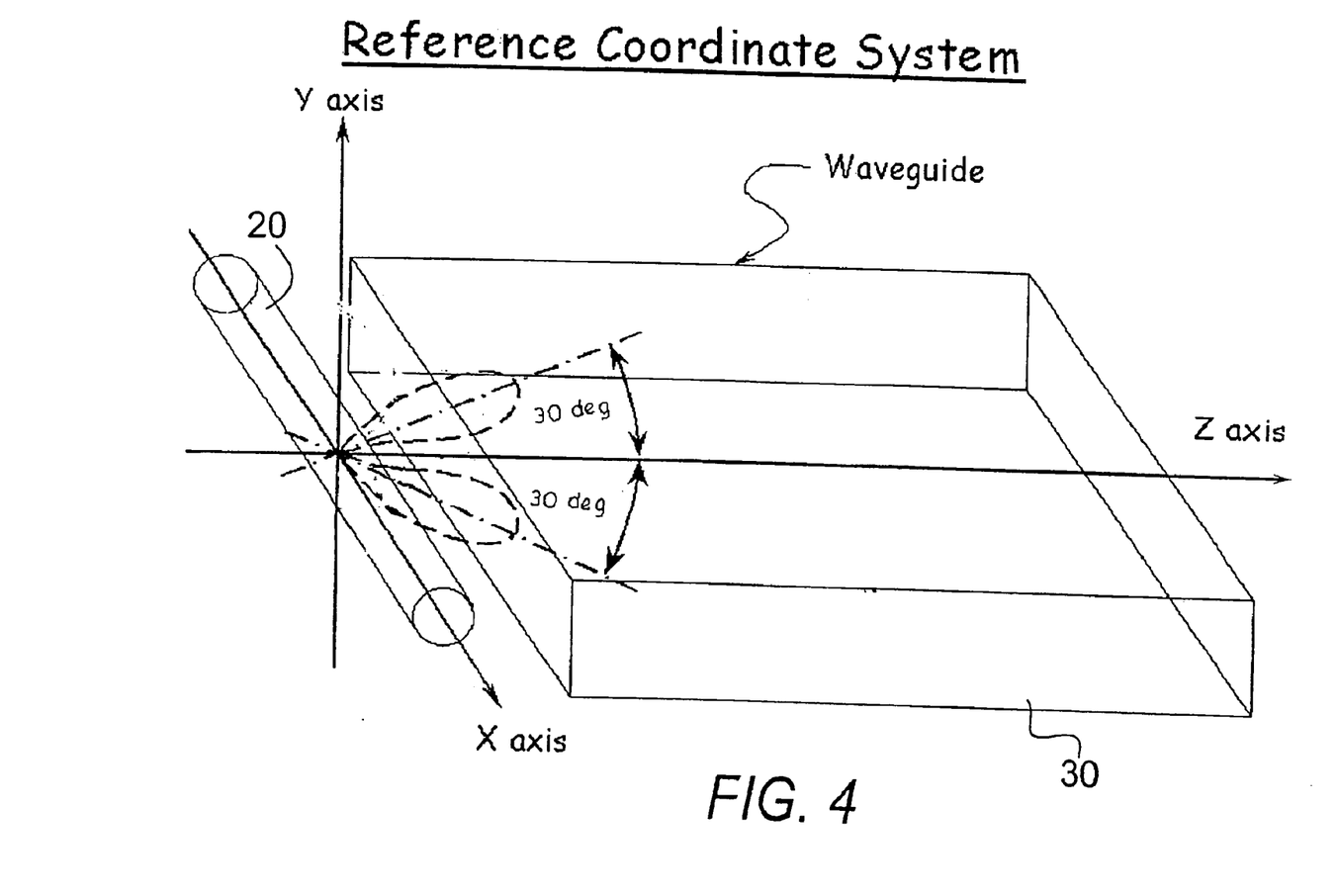
FIG. 4 is a schematic depiction of the two lobes of light entering the associated waveguide in the embodiment of FIG. 3.
Figure 5:
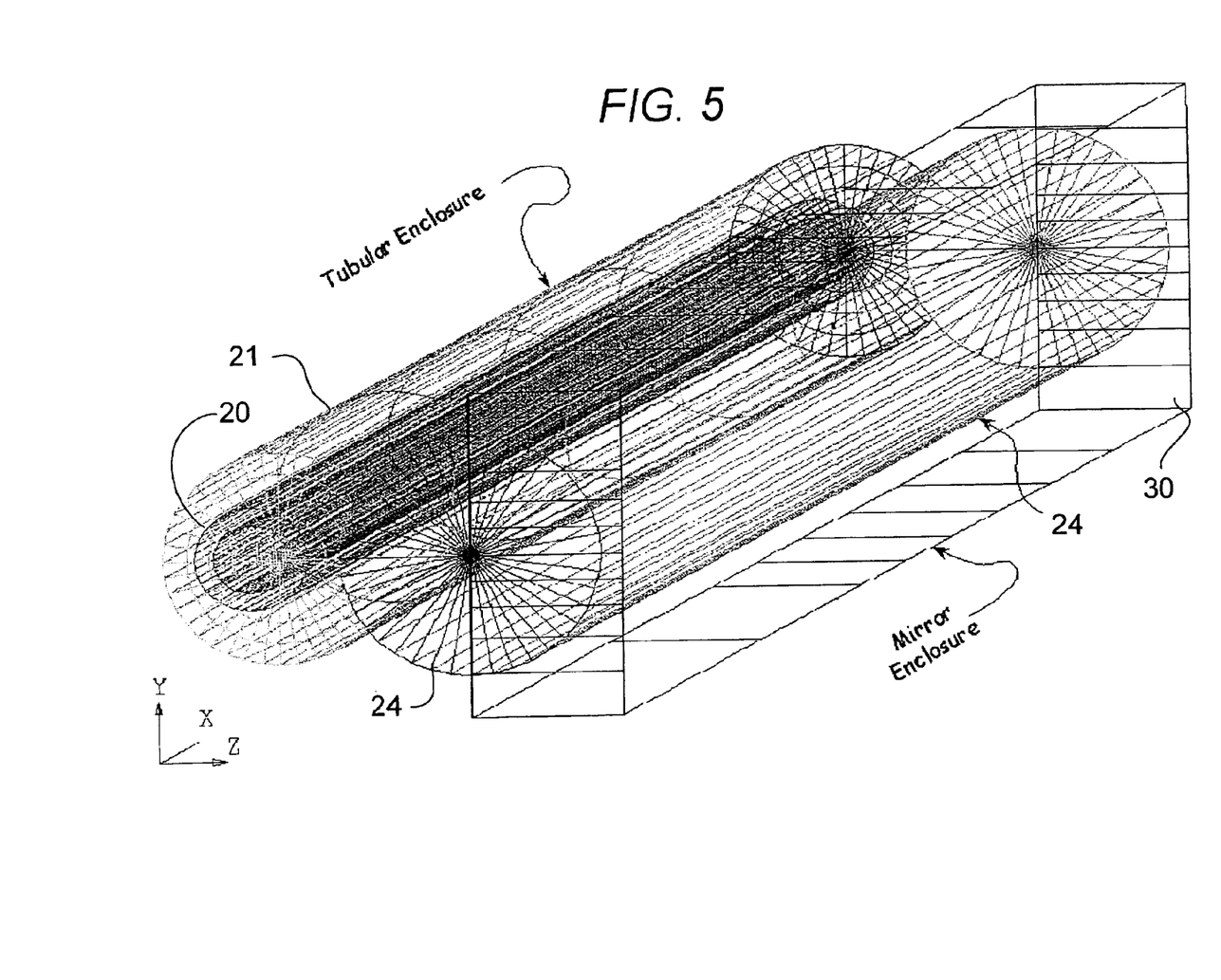
FIG. 5 is a stylized elongated perspective view of the embodiment of FIG. 3.

Referring now to FIGS. 3, 4, and 5, cylindrical rod lens 24 is positioned adjacent to a tubular enclosure 21 containing a tubular lamp 20 in a manner similar to that described above. In contrast to the Wilson arrangement, which includes a single linear slit opening 15 providing a wide angular range, the present invention includes a linear slit opening 25 partially obscured by an opaque white reflective strip 27 thereby forming two thin slits 22 each having a separate narrow angular range. The light lobes that are projected though these two slits 22 are illustrated in FIG. 4.

The white stripe 27 runs the length of the rod lens 24 and is oriented such that it is centered in linear slit opening 25. Accordingly, it forms two thin slits 22 through which light enters the cylindrical rod lens 24. In a preferred embodiment, the light is later projected from rod lens 24 into a waveguide light input edge.

It is preferable that the reflective properties of white stripe 27 are similar to those of the white interior surface of the tubular enclosure 21. Accordingly, the white stripe 27 could be fashioned from material removed from the tubular reflector to create its slit opening, and then glued to the rod lens. Alternatively, the masking the rod lens 24 could be masked and coated with paint.

Both uniformity and efficiency are improved, as compared to the Wilson configuration, because the narrow ranges of our invention are significantly less than the Wilson angular range. Advantageously the performance of a liquid crystal display (LCD) backlight utilizing this invention is significantly better than one utilizing Wilson because of the smaller range input angle that the extraction process is required to handle.

For best performance of the lens, both the shape of its input and output surfaces must be optimized. The design variables are lens thickness, refractive index, front and rear lens surface shapes, slit width, and a set of angular beam projection requirements. In one embodiment, the front surface of the cylindrical rod lens 24 has an aspheric shape to eliminate spherical aberration. The rear surface can be given a different curvature than the front surface to keep the slit in focus. It is desirable to have the slit edges in focus when the light input to it is from a lambertian reflecting cavity source.

In its simplest form, both the front and rear surfaces of a rod lens are cylindrical. In this case it will be advantageous for both cylinders to have a common axis to form a cylindrically concentric design. In this way it becomes possible to select different cylinder radii for the front and rear surfaces, which will usually be required for an optimally focused enslitted area. Optimal choice of the radii depends on the lens medium refractive index. In cylindrically concentric designs, any area element within the slit sees the same lens thickness and has the same projection geometry.

The rod lens cross-sectional shape can be manufactured using an extrusion, a molding, and/or an ablation process. The lens medium can be a suitable transmitting plastic or glass. In one embodiment, a glass rod can be ground and polished to generate the optimal surface shapes and lens thickness.

Thick and dim slit edges can be avoided by applying instead a thin opaque and diffuse white coating stripe to the rod lens 24 surface. Alternatively, the stripe coating could be a thin specular mirror coating such as aluminum. If these thin stripe coatings are less efficient than their previously-discussed thick alternatives, their lower efficiency will have little influence upon the overall efficiency of a backlight source because the stripe areas are only a very small fraction of the total area internal to the tubular enclosure, and because the stripe surface has no direct view of adjacent slit areas. A stripe with a mirror coating cannot reflect light directly into an adjacent slit. Instead, the light it reflects will fall on another white diffusely reflecting surface, which may have a direct view of the slits.

The axes of the two light beams projected by the rod lens 24 each pass through the center of the rod lens and through the center of each thin slit 22. Accordingly, if these axes (which are also the centerlines of the lobes) are each 30 degrees from the Z-axis, then the lobe centerlines will each be 30 degrees from the Z-axis and they will also be separated from each other by 60 degrees as shown in FIG. 4.

Referring next FIG. 4, a computer ray-trace model of one illustrative embodiment is shown. This ray-trace model included a lambertian reflecting coating with a total integrated scattering magnitude of 0.95 on both the inside surface of the tubular enclosure 21 and the white stripe 27. To determine the effect of changing the properties of these lambertian surfaces to be, instead, purely specular (mirror) surfaces, these surfaces were changed to have a specular reflectance of 0.95. This gave them the same reflectance efficiency as their lambertian counterparts. This lambertian version has a higher efficiency (39.21%) as compared to the efficiency (21.93%) of the specular version. Real white coatings have complex reflectance properties, which are neither purely lambertian nor purely specular. These modeling results indicate that purely lambertian tube and white stripe 27 surfaces having the same reflectance as corresponding purely specular surfaces will produce a higher system efficiency for embodiments having the same geometry and employing the same lamp.

For solid white tube materials that are naturally highly specular, it is possible to make tube enclosures made of these materials more diffuse by roughening their surfaces. However, owing to the increased surface area of a roughened surface produced by "nooks and crannies" of the roughness features, the total integrated scattering coefficient of a rough surface will be lower than its smooth counterpart. This decrease is caused by the roughness features, which tend to make light incident on a microscopic local area reflect from feature surfaces within that region more than once before leaving it. The resulting increase in the number of surface light interceptions cause an increase in light absorption, which lowers the effective surface reflectance of a roughened surface made of the same material as a smooth surface. Accordingly, there is an optimum degree of roughness that maximizes system efficiency. This optimum roughness depends on both system geometry and the loss of reflectance caused by the increased roughness and is best determined empirically for a given tube enclosure material and system geometry.

System geometries that have enslitted areas that are a large fraction of the surface areas internal to the tubular enclosure will increase system efficiency and will be less dependent on whether surface reflections are specular or diffuse. When the fractional enslitted area is large, light from the lamp is projected from the tube enclosure with few reflections from surfaces internal to the tube. Fewer reflections lower light absorption and thereby improve efficiency. However, this improvement is obtained at the expense of collimation loss owing to the increase in enslitted area. Narrow slits with small enslitted areas improve collimation; however, this improvement is obtained at the expense of efficiency owing to the increased number of light reflections internal to the tube enclosure caused by narrow slits. In addition, because the number of internal reflections has increased, an increase in the specular reflectance component of surfaces internal to the tube will lower the system efficiency to a greater extent.

Figure 6:
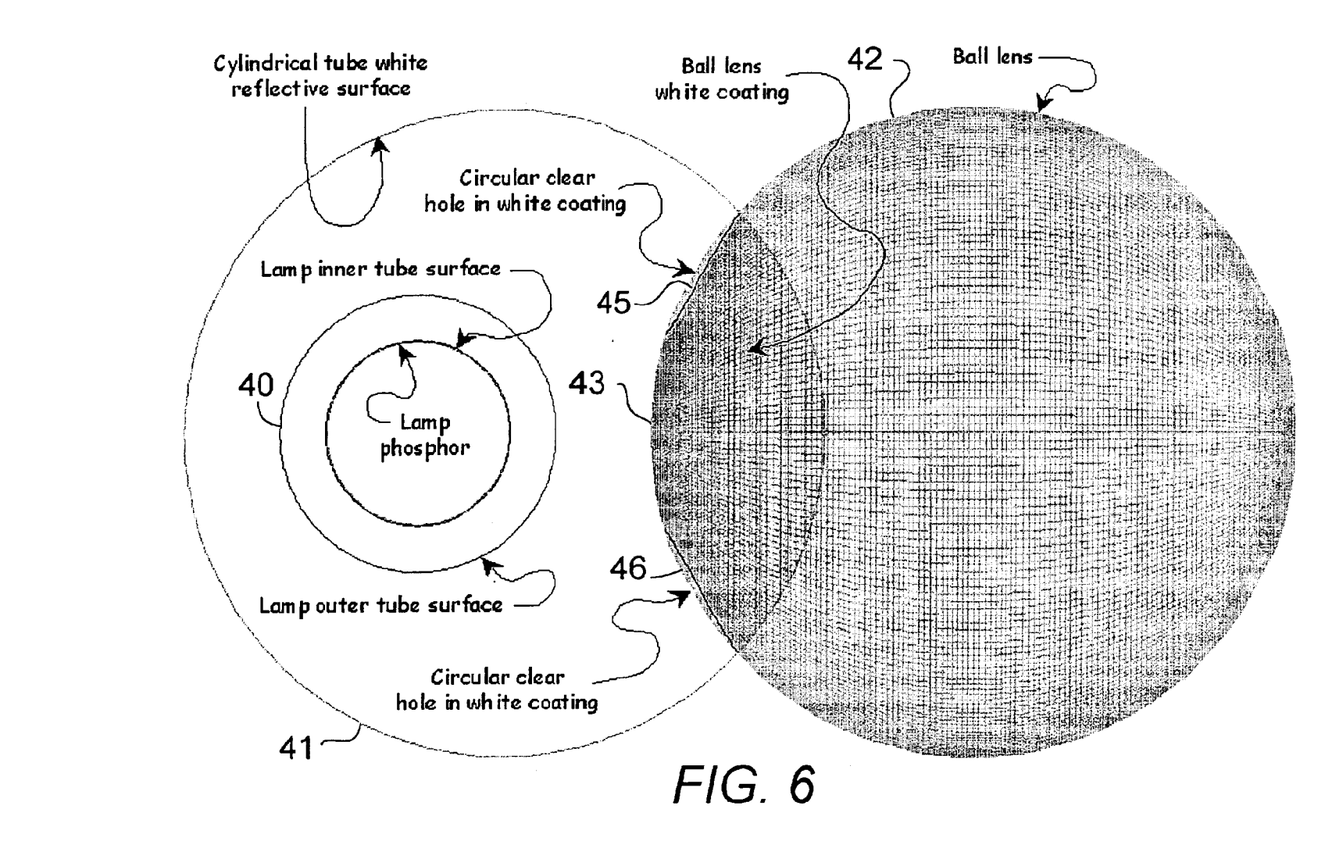
FIG. 6 depicts a second illustrative embodiment of our invention wherein the lens structure comprises spherical ball lenses.

Referring next to FIG. 6, an embodiment of our invention using an array of ball lenses 42 instead of a rod lens to project light into the light input edge of a waveguide backlight is shown. As seen in FIG. 6, the tubular enclosure 41 in which the tubular lamp 40 is positioned has the elongated slit into which an array of lens balls 42 is positioned, one of the lens balls being depicted in the figure. The ball lens 42 has its central section positioned within the tubular enclosure coated with a reflective material 43, thereby providing two clear holes 45 and 46 through which the two distinct light lobes are projected into the ball lens. Advantageously, the use of ball lenses provides two lobes having substantially symmetrical angular distribution profiles taken in orthogonal planes through the axis of each lobe. As described previously, the light output of the array of ball lenses is projected into the light input edge of a waveguide backlight.

An alternative means of controlling the angular properties of light projected by a luminare is to have an unpatterned clear area in the specularly or diffusely reflecting surface on a ball lens, where that surface is internal to the luminare enclosure, where that clear area could be circular, and where the clear area is shifted toward the edge of the luminares's ball lens receptacle thereby deflecting the propagation direction of the beam projected from the ball lens. There can be a one or two-directional array of such ball lenses, depending on the size of the ball lenses and the size and shape of the luminare's downward-facing surface. The ball lenses of the array could have their clear area openings turned in various directions, like eyeballs turned in their respective eye sockets. This arrangement can be designed to project an array of beams in various downward directions to generate a composite down-light beam that meets a specified directional uniformity specification. As on the up-light side of the luminare, a sheet or slab of glass, acrylic, or other light-transmitting medium can be employed to cover the array of ball lenses and to make the resulting smooth down-light side of the luminare easy to clean. In addition, if this ball lens cover is stiff enough, it can perform "double-duty" by securing the array of ball lenses in their luminare sockets.

Figure 7:
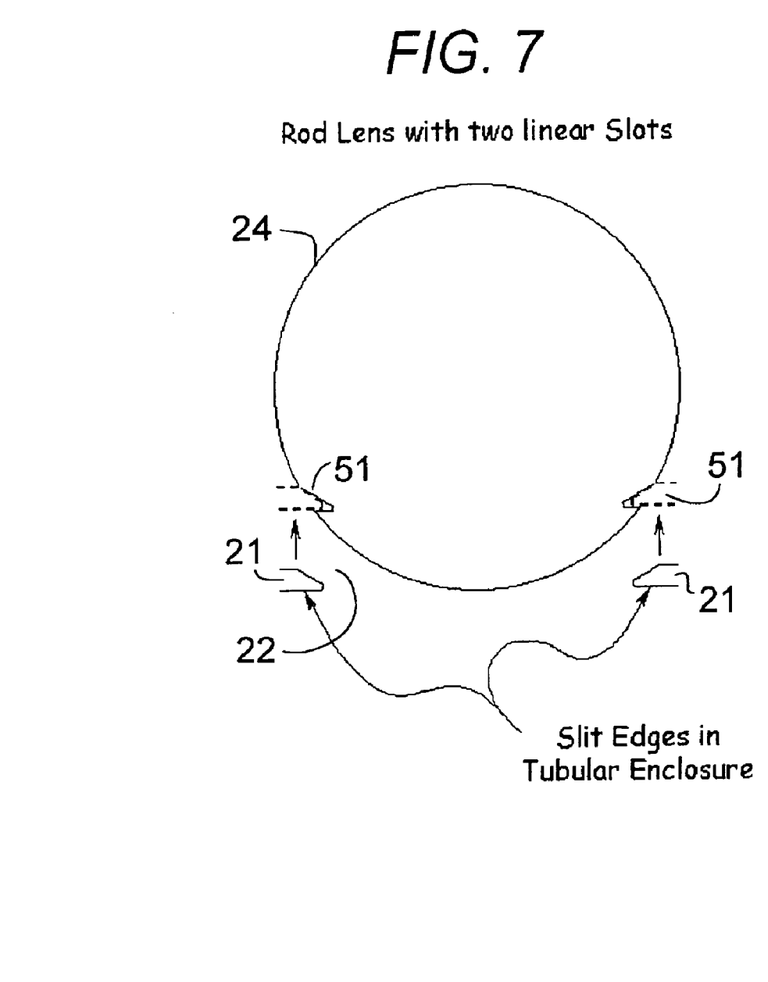
FIG. 7 illustrates how the lens structures of the embodiment of FIG. 3 can be mounted in the slit openings of the tubular enclosures.
Figure 8:
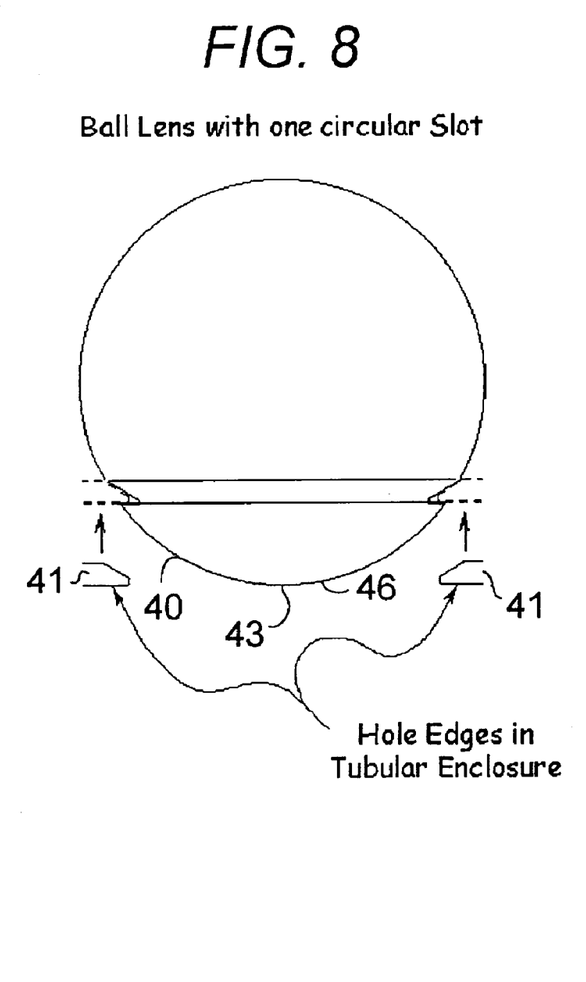
FIG. 8 illustrates how the lens structures of the embodiments of FIG. 6, respectively, can be mounted in the slit openings of the tubular enclosures.

Referring to FIGS. 7 and 8, rod lenses and ball lenses can be secured in their receptacles without an adhesive bead or a window panel or a waveguide light input surface to secure them in position. The slot edges, 21 and 41 respectively, are designed to have a smooth interface with the tubular enclosure's interior thereby minimizing reflectance efficiency losses. Advantageously, these interfaces have lower reflectance than smooth surfaces on the same material, or than surfaces having the same coating.

The tube's slotted receptacles and the mating grooves edge 51 in the rod or circular groove 52 in the ball lens are designed such that the lenses can be "snapped" into their receptacles when the slotted openings are pushed into the lenses, or vice versa. When the lenses are inserted, the opening enlarges in response to the insertion force and "snaps" into place in the groove. The tubular enclosure for ball lenses would have a flat surface for the ball receptacle so that the mating circular slot in the ball will lie in a plane. This means of attachment can also be employed for securing rod or ball lenses in luminares.

Alternate Embodiments

Alternate embodiments may be devised without departing from the spirit or the scope of the invention.

What is claimed is:

1. A backlight for a display comprising:
   (a) a tubular enclosure having a linear slit opening;
   (b) a light source located within said tubular enclosure; and
   (c) lens means for receiving light from said light source through said linear slit opening and projecting said received light to a waveguide light input edge, said lens means being partially positioned in said linear slit opening to fill said linear slit opening and having an opaque light masking element located on said lens means positioned within said tubular enclosure so as to block light from said light source entering said lens means except at two discrete openings at opposite sides of said linear slit opening.

2. The backlight for a display in accordance with claim 1 wherein said lens means comprises an elongated rod running the length of said tubular enclosure.

3. The backlight in accordance with claim 2 wherein said masking element comprises a white reflective strip.

4. The backlight in accordance with claim 3 wherein the interior of said tubular enclosure is coated with the same white reflective material as said white reflective strip on said elongated rod.

5. The backlight in accordance with claim 2 wherein said elongated rod has linear grooves extending along its length and mating with the edges of said linear slit opening.

6. The backlight in accordance with claim 2 wherein the front surface of said elongated rod has an aspheric shape to eliminate spherical aberration.

7. The backlight in accordance with claim 1 wherein said lens means comprises an array of ball lenses extending the length of said tubular enclosure.

8. The backlight in accordance with claim 7 wherein said masking element comprises a reflective white coating on the portion of each of said ball lenses extending through said linear slit opening within said tubular enclosure adjacent the edges of said linear slit opening.

9. The backlight in accordance with claim 7 wherein said array of ball lenses extends the length of said tubular enclosure, each of said ball lenses having a circular groove therein mating with the edge of said linear slit opening.

10. A light source for a display comprising:
    (a) a tubular enclosure having a reflective inner coating and a linear slit opening along the length of said enclosure;
    (b) an elongated light source positioned within said tubular enclosure and projecting light towards said linear slit opening; and
    (c) means for blocking light from projecting through the central area of said linear slit opening and creating two discrete thin openings removed from each other and at opposite sides of said linear slit opening so as to create two light lobes projected out of the tubular enclosure at different angles.

11. The light source in accordance with claim 10 further comprising a lens means positioned within said linear slit opening and extending the length thereof, said means for blocking comprising a masking coating on said lens means within said linear slit opening.

12. The light source in accordance with claim 11 wherein said lens means comprises an elongated rod lens.

13. The light source in accordance with claim 12 wherein said masking coating comprises a white reflective coating.

14. A light source for a display comprising:
- a tubular enclosure having a reflective coating and a linear slit opening along the length of said enclosure;
- an elongated light source positioned within said tubular enclosure and projecting light towards said linear slit opening;
- means for blocking light from projecting through the central area of said linear slit opening so as to create two different light lobes projected out of the tubular enclosure at different angles, and
- a lens means comprising an array of ball lenses extending the length of said tubular enclosure and positioned within said linear slit opening and extending the length thereof, said means for blocking comprising a masking coating on said lens means within said linear slit opening so as to define two separate openings removed from each other at opposite sides of said linear slit opening.

15. The light source in accordance with claim 11 wherein said lens means has a groove that mates with opposite sides of said linear slit opening.

16. The light source in accordance with claim 11 further comprising a waveguide input edge which receives the light of both of said lobes from said lens means.

* * * * *